March 28, 1961  B. H. FORD  2,977,148
DISPOSABLE PALLET
Filed July 11, 1957
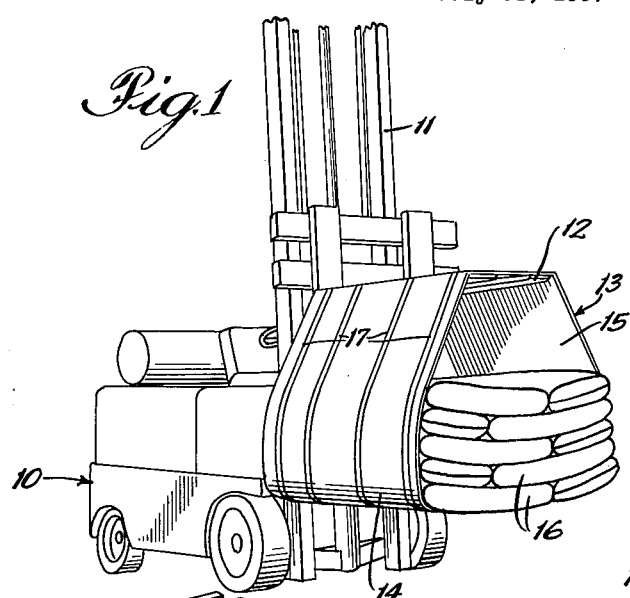
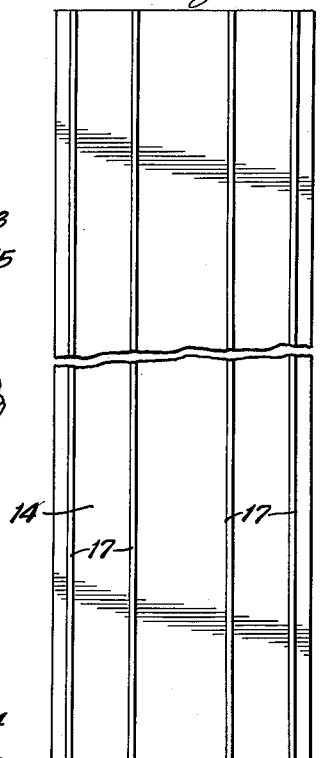
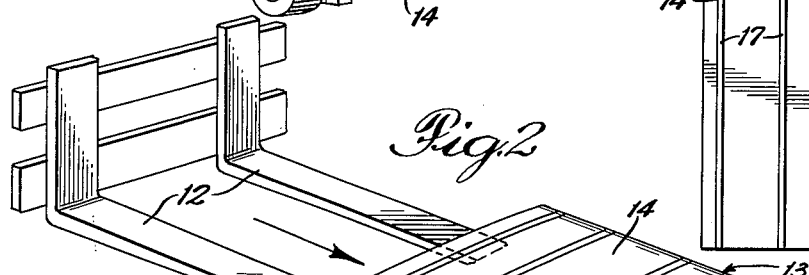
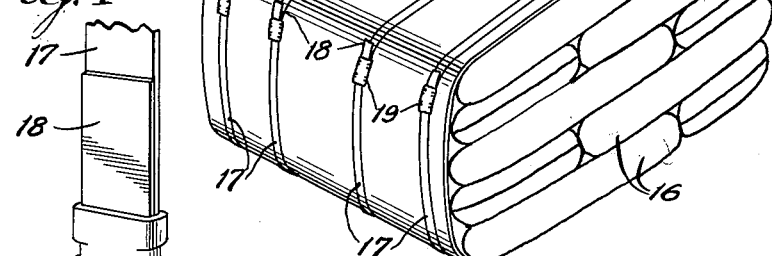
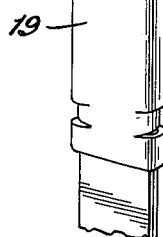
INVENTOR:
Barton H. Ford,
BY Dawson, Tilton, Fallon & Lungmus,
ATTORNEYS.

2,977,148
DISPOSABLE PALLET

Barton H. Ford, Omaha, Nebr., assignor, by mesne assignments, of one-half to International Paper Company, New York, N.Y., a corporation of New York, and one-half to The Stanley Works, New Britain, Conn., a corporation of Connecticut Filed July 11, 1957, Ser. No. 671,322

2 Claims. (Cl. 294—74)

This invention relates to a disposable pallet, and, more particularly, to a disposable pallet constructed of a flexible panel.

Conventionally, pallets of the type contemplated by this invention are constructed of wood and have what might be termed a raft-like appearance. Such structures are employed for supporting goods during transport about and storage in warehouses. The wooden raft-like pallets are equipped with a number of cross braces securing the wooden beams together, which also serve as legs and spacers when the pallet is lifted on the forks of a lift truck.

A number of disadvantages are present in the conventionally-employed pallets described above. One disadvantage results from the size of the pallet which, in many cases, limits the space that can be utilized in a warehouse. The wooden pallet, because of its rigid construction, will occupy the same space in a warehouse irrespective of its degree of loading. The pallet further limits the effective utilization of storage space since it itself occupies several inches in height which is necessary in order to provide space for the insertion of the forks of a lift truck. Thus, where several pallets and goods supported thereon are superimposed, a considerable portion of storage space is ineffectively used. Still further, because of the wooden construction of ballets, they are intended to be used for a considerable time. Through the normal handling and bumping, scraping, and the like, they become weakened and consequently fail, sometimes when supporting a critical load. Also the rigid pallets provide support only on one side of the load, i.e., the bottom, so that if the pallet should be rocked or the load bumped, there is nothing to prevent lateral damage.

It would, therefore, be desirable if a pallet could be provided that is disposable; that would not limit the utilization of space in storage places and which at the same time would be rugged and adapted for use with conventional storage machinery such as lift trucks so that the change-over could be readily effected without having to retrain operators, and the like.

It is an object of this invention to provide a pallet which overcomes the problems and drawbacks discussed above. Another object is to provide a disposable pallet. Still another object is to provide a pallet which will occupy relatively little space when goods supported thereon are stored, as in superimposed fashion. Another object is to provide a disposable pallet that affords substantially greater protection for goods supported thereon than presently employed pallets. Other objects and advantages of this invention can be seen as this specification proceeds.

My invention will be explained in conjunction with the accompanying drawing, in which—

Fig. 1 is a perspective view of a disposable pallet embodying principles of this invention, shown in an operative environment; Fig. 2 is an enlarged fragmentary view of the disposable pallet shown in Fig. 1; Fig. 3 is an enlarged fragmentary view of a pallet embodying teachings of this invention but prior to folding; and Fig. 4 is an enlarged fragmentary view of one of the securing straps associated with the pallet.

In the illustration given, the numeral 10 designates generally a lift truck. Such trucks are well known to those conversant with the handling of palletized goods, so it is believed sufficient to state that a lift truck is conventionally operated by one man who manipulates controls so as to raise and lower a carriage, the carriage being designated by the numeral 11 in Fig. 1. In the drawing, particularly Fig. 2, carriage 11 is shown equipped with a piar of forwardly-extending prongs or forks 12 which are capable of supporting a load and lifting it from the floor or other location and lodging it in a different place or at a different height.

In Fig. 1, the forks 12 of lift truck 10 are shown inserted through a disposable pallet generally designated 13. Pallet 13 is constructed of a flexible panel 14 folded on itself to provide an open-ended chamber 15. Supported within the open-ended chamber 15 are goods to be stored, as designated by the numeral 16. In Figs. 1 and 2, goods 16 are shown as filled bags of material such as grain, cement, feed, etc. Fig. 3 shows a panel prior to folding.

Pallet 13 also includes a plurality of spaced reinforcing bands 17 which are disposed in parallel relation and are adhesively secured to the outer side of flexible panel 14. The end portions 18 of straps 17 are not adhesively secured to panel 14, but are secured together by means of clinching members 19 seen in Figs. 2 and 4.

Excellent results have been obtained when panel 14 is constructed of corrugated paper board. When corrugated paper board is employed for panel 14, excellent results have been obtained with three paper thicknesses: two outer liners adhesively secured to a corrugated medium. I have found it desirable to provide the flutes of corrugated medium perpendicular to the length of straps 17.

It is believed that this invention can be further appreciated by a consideration of the following description, wherein a typical assembling and loading operation is set down.

Operation

When it is desired to employ the disposable pallet of my invention for supporting goods to be stored such as sacks of grain, a panel 13 is first provided which presumably may be rectangular in outline. Adhesively secured to one side of panel 13 are straps 17. The ends of the straps are not so secured, to permit ready connection by clinching members 19. Straps 17 may be spaced apart four or five inches, and may be constructed of 0.020" black steel. Panel 14 may be conveniently constructed of kraft paper having a thickness in the range of 0.030"–0.050". Three thicknesses of paper are ordinarily considered suitable for this purpose, one of which is corrugated and adhesively secured to the other two thicknesses. A panel such as has been characterized immediately above is placed on the ground with the straps bottomwise. Thereafter, goods 16 are placed on the pallet 13 and the pallet is folded upon itself to provide a structure such as is shown in Fig. 1. Thereafter, the unattached end portions 18 of straps 17 are secured together as by clinching members 19. Excellent results are obtained when the disposable pallet is only partially filled so as to provide a slight slack in the pallet, thereby affording ready access for the forks 12 of a lift truck 10.

By providing panel 14 of corrugated paper board, the flexible panel is characterized by a slight resiliency so that after storage with other material supported on pallet 13, there is a tendency for the upper portion of pallet 13 to snap away from the goods supported within chamber 15 and thereby afford convenient access for forks 12 of lift truck 10. Cooperating in providing this resiliency are reinforcing straps 17, which urge disposable pallet 13 from the flat shape into which it is pressed when goods are stored on it, into a slightly ovular shape which facilitates insertion of lift truck forks.

Alternatively, it is possible to interposition straps 17 between the corrugated medium and one of the liners of panel 14. When this is done, provision is made for exposing the end portions of straps 17 such as by scoring the liner adjacent the longitudinal edges of straps 17.

With panels of the type described, the desirable disposable feature is achieved because of their low cost of manufacture. Unlike wooden pallets which are generally hand assembled, pallets of the type described herein can be readily machine produced. Flexible sheeting, corrugated paper board or otherwise, can be provided in a continuous web to which spaced metal straps can be secured, as by glueing, overlaying an additional paper sheet, stapling, etc. The joined straps and sheeting are then simultaneously severed transversely of the length of the web whereupon a panel is provided ready for use.

While in the foregoing specification an embodiment of this invention has been set forth in considerable detail, it will be apparent ti those skilled in the art that modifications in those details can be made without departing from the spirit and scope of the invention.

I claim:

1. A disposable pallet for use with a fork lift truck, comprising a rectangular flexible panel constructed of corrugated paperboard, the flutes of said panel extending transversely of the length of said rectangular panel, a plurality of resilient metal reinforcing straps secured to one side of said panel in spaced-apart relation and parallel to the panel length, the ends of each strap being free of securement to said panel to provide free ends interconnectable to arrange each strap in a hoop-like formation, and means on each strap for securing the ends thereof together independently of the remaining straps, the said flutes being effective to maintain said straps in spaced relation even when said panel is folded on itself about a load but being ineffective to prevent the panel form conforming to the load.

2. In a disposable pallet, a flexible paperboard panel having a corrugated core disposed between outer paper liners, a plurality of flat resilient metal straps secured to said panel on one side of said core, said straps being arranged in parallel, spaced-apart relation perpendicular to the direction of the flutes of said core whereby said panel can be folded on itself parallel to said flutes with said straps outwardly disposed to conform to the shape of a load placed on said panel, means joining the ends of each strap together independently of the other straps whereby the straps in closed condition remain spaced from said load to provide a plurality of support slings for said load.

References Cited in the file of this patent

UNITED STATES PATENTS

| | | |
|---|---|---|
| 1,462,897 | Barto | July 24, 1923 |
| 1,705,059 | Hintz | Mar. 12, 1929 |
| 1,816,399 | Roitwedder | July 28, 1931 |
| 2,159,622 | Sanford | May 23, 1939 |
| 2,269,286 | Ott | Jan. 6, 1942 |
| 2,432,295 | Donahue | Dec. 9, 1947 |
| 2,506,346 | Crawford | May 2, 1950 |
| 2,571,748 | Newman | Oct. 16, 1951 |
| 2,620,921 | Schaller | Dec. 9, 1952 |
| 2,658,614 | Van Patten | Nov. 10, 1953 |
| 2,698,696 | Strong | Jan. 4, 1955 |
| 2,739,920 | Martin | Mar. 27, 1956 |
| 2,793,903 | Mallard | May 28, 1957 |
| 2,822,044 | Leslie | Feb. 4, 1958 |
| 2,869,721 | Baumer | Jan. 20, 1959 |